Patented May 10, 1932

1,857,562

UNITED STATES PATENT OFFICE

CARL J. MALM AND ARNE ANDERSEN, OF ROCHESTER, NEW YORK, ASSIGNORS TO EASTMAN KODAK COMPANY, OF ROCHESTER, NEW YORK, A CORPORATION OF NEW YORK

METHOD FOR THE PRODUCTION OF LOW VISCOSITY CELLULOSE ESTERS

No Drawing. Application filed June 29, 1929. Serial No. 374,940.

This invention relates to a method for reducing the viscosity of cellulose esters and particularly to the use of ozone in reducing the viscosity of cellulose acetate.

The production of cellulose esters is well known to those skilled in this art and no more than a reference thereto need be made for the understanding of this invention. For instance, the production of cellulose acetate divides itself normally into three steps comprising, (1) the pre-treatment of the cellulose with acetic acid with or without a catalyst; (2) the acetylation of the pre-treated cellulose with acetic anhydride; and (3) the hydrolysis of the acetylated cellulose by destroying the anhydride with a small amount of water. The control of the viscosity which the finished cellulose acetate will have upon solution thereof in a suitable solvent is important. The control of such viscosity during the production of the cellulose acetate has been found to have a number of difficulties and to require a rather perfect technique of operation in producing a cellulose acetate of the desired viscosity without affecting the character of the cellulose acetate in a deleterious manner.

In the pre-treatment step and in the acetylation step it is known that the viscosity of the final cellulose product may be lowered by the use of excessive amounts of a mineral catalyst or the employment of higher temperatures or longer reaction times than are customarily employed. During the hydrolysis step the viscosity of the final product may be reduced by restricting the amount of water used or increasing the temperature and/or the amount of mineral acid employed. Care must, however, be taken in employing these methods to avoid undesirable degradation of the acetate.

We have discovered a method by which cellulose acetate produced by methods most satisfactory to the industry because of their simplicity may be employed for uses for which the product could not heretofore be utilized. Such acetate normally has a rather high viscosity when placed in solution with chloroform, acetone or other suitable solvent. We have discovered that by treating dried cellulose acetate with ozone gas that the character of the cellulose acetate is unexpectedly changed so that upon solution with a suitable solvent the viscosity is considerably lower than that which the product would have if placed in solution in the same solvent in the same proportions without having previously been treated with ozone according to our invention. As hereinafter pointed out our invention is also applicable to the treatment of cellulose nitrate and other cellulose esters and derivatives.

As an example of the method of employing our invention, but by which we shall, of course, in no way be limited, we may state that we employed well washed acetone soluble cellulose acetate which had been oven dried and later exposed to air and which, when dissolved in four parts of acetone had a viscosity of 120,000 centerpoises. Five pounds of this cellulose acetate was placed in a vessel which was maintained at approximately room temperature and a slow stream of a gas containing ozone, as produced by passing oxygen through any commercially available ozone machine capable of producing a concentration of ozone of 2 or 3 per cent, was passed through the acetate at a rate of approximately one liter of ozone containing gas per minute. We found, by test of a sample withdrawn from the batch after 15 minutes treatment, that the acetate was well bleached to a very desirable whiteness but that the viscosity of the acetate was not materially changed.

However, we found upon continuation of the ozone treatment for an hour and fifteen minutes that the viscosity of a sample in four parts of acetone had decreased to 26,000 centerpoises or less than one-fourth of the original viscosity of the acetate in acetone. We also found that after the acetate had been ozonized for a period of two hours that the viscosity of the acetate as evidenced by a solution of a simple in four parts of acetone had been reduced to 3,700 centerpoises or less than one-thirtieth of the viscosity of the original acetate. Further ozonizing of the acetate reduced the viscosity thereof an additional amount. We found that cellulose acetate which had been ozonized as described for two hours gave, when coated from an acetone solution, a film of good appearance and good flexibility comparing quite favorably with a film produced from acetate the viscosity of which had not been lowered.

As an example of the manner in which our invention can be applied to the reduction of the viscosity of cellulose nitrate we may state that a slow stream of gas containing ozone was also passed through cellulose nitrate, ten grams of which when dissolved in 100 ccs. of a fifty-fifty mixture of acetone and methyl alcohol had a viscosity of 6,700 centerpoises. After fifteen minutes of ozonizing treatment we found the cellulose nitrate to be well bleached but the viscosity thereof not to have been appreciably lessened. However, after the ozonizing treatment had been continued for a period of one hour we found that a solution of ten grams of the ozonized nitrate when dissolved in 100 ccs. of a fifty-fifty mixture of acetone and methyl alcohol had a viscosity of only 600 centerpoises or less than one-tenth of the viscosity of the original nitrate.

Other cellulose esters can be treated in the same manner or in a manner similar to that above described to obtain cellulose products which, upon solution, will have a much lower viscosity than would be otherwise obtainable.

It should be quite obvious that the amount of cellulose ester which is ozonized is quite immaterial so long as a proper circulation of the ozone through the ester is obtained. We do find it preferable to only treat dried cellulose esters, such as the acetate and nitrate, as otherwise the ozone would merely combine with the water in the cellulose ester to form hydrogen peroxide which has little viscosity reducing value. Also variations in the rate at which the ozone is circulated through the cellulose ester seem to follow those laws which it would ordinarily be expected to follow, namely, the more dilute or the less the rate at which the ozone is supplied to the cellulose ester the less will be the effect of the process. If the ozone is supplied at a greater rate than the proportion above suggested or under increased temperature or pressure the effect thereof will be to increase the rate of the reaction, namely, to increase the speed with which the viscosity of the cellulose ester will be reduced. There is, of course, a limit to which the supply of ozone may be efficiently increased as it must be left in contact with the cellulose ester for a reasonable length of time in order to completely utilize the available ozone in the gas. Also, the concentration of the ozone in its carrying gas must not be so great as to cause combustion of the cellulose derivative being treated.

The gaseous medium by which the ozone is supplied to the cellulose ester is more or less immaterial so long as it is inert to the cellulose, it appearing to be merely necessary that the cellulose ester be fairly well dried prior to the passage of the gas therethrough in order that ozone may be supplied to the cellulose particle for accomplishing the change necessary to reduce the viscosity of the cellulose ester when in solution. It is not thought necessary to elaborate upon the theory underlying the cause for this viscosity reduction.

Suffice it to say that we have found that upon supplying ozone to a relatively dry cellulose ester that the ester will be so affected as to give a product having a much lower viscosity, when in solution in a suitable solvent than the untreated cellulose ester would otherwise have. Other cellulose derivatives such as the mixed esters and the cellulose ethers may also be treated in accordance with our invention to reduce the viscosity thereof.

Our invention has the distinct advantage in that by its use a manufacturer of cellulose esters may, without particular regard to controlling the viscosity of the final product, produce that ester in a manner which is devoid of some of the complications which are attendant upon the control of viscosity by some of the well-known methods and thereby greatly reduce the cost of manufacture merely by an additional ozonizing treatment which is far less expensive than the obtaining of a product of low viscosity by other known methods. Further, since the extent to which the viscosity of any given cellulose ester may be reduced by our ozonizing treatment is quite readily controlled by merely controlling the flow or concentration of the product may be obtained having the desired viscosity.

In the foregoing specification and in the claims appended hereto, where reference is made to the viscosity of a cellulose ester such as cellulose acetate or cellulose nitrate, such terminology is used somewhat loosely and it is to be noted that where such terminology is employed it is intended to refer to the viscosity which that cellulose ester would have when dissolved in a given quantity of a suitable solvent. Also, ozone is used to indicate an ozone bearing gas.

What we claim as our invention and desire to be secured by Letters Patent of the United States is:

1. The process of reducing the viscosity of a cellulose ester which comprises passing ozone through the cellulose ester until the viscosity of the cellulose ester is materially reduced.

2. The process of reducing the viscosity of cellulose acetate which comprises passing ozone through cellulose acetate until the viscosity of the cellulose acetate is materially reduced.

3. The process of reducing the viscosity of cellulose nitrate which comprises passing ozone through cellulose nitrate until the viscosity of the cellulose nitrate is materially reduced.

4. The process of reducing the viscosity of a cellulose ester which comprises passing ozone, conveyed by an inert gaseous vehicle, through a cellulose ester for a longer time than required to merely bleach the cellulose ester.

Signed at Rochester, New York, this 20th day of June 1929.

CARL J. MALM.
ARNE ANDERSEN.